United States Patent
Shimizu

(10) Patent No.: US 6,168,015 B1
(45) Date of Patent: Jan. 2, 2001

(54) CD PACKAGE

(75) Inventor: Hirokazu Shimizu, Tokyo (JP)

(73) Assignees: Shimizu Printing & Packaging Co., Ltd., Tokyo; Fuji Cone Seisakusho Co., Ltd., Shizuoka-Ken, both of (JP)

(*) Notice: Under 35 U.S.C. 154(b), the term of this patent shall be extended for 0 days.

(21) Appl. No.: 09/438,678

(22) Filed: Nov. 12, 1999

(30) Foreign Application Priority Data

Mar. 31, 1999 (JP) .................................................. 11-002022

(51) Int. Cl.[7] .................................................. B65D 85/30
(52) U.S. Cl. ........................ 206/308.1; 206/310; 206/312; 206/493
(58) Field of Search ..................... 206/308.1, 310–313, 206/493

(56) References Cited

U.S. PATENT DOCUMENTS

| | | | |
|---|---|---|---|
| 4,652,341 | * 3/1987 | Prior | 162/79 |
| 5,427,236 | 6/1995 | Kramer . | |
| 5,593,030 | * 1/1997 | Tell | 206/308.1 |
| 5,709,300 | * 1/1998 | Bolognia et al. | 206/308.1 |
| 5,788,069 | 8/1998 | Calhoun, III et al. . | |
| 5,816,394 | * 10/1998 | O'Brien et al. | 206/308.1 |
| 5,819,926 | * 10/1999 | O'Brien et al. | 206/308.1 |
| 5,839,575 | * 11/1999 | Blanco | 206/232 |
| 5,884,761 | * 3/1999 | Gelardi et al. | 206/308.1 |
| 5,921,386 | * 7/1999 | Smith | 206/308.1 |
| 5,931,293 | * 8/1999 | Seelenmeyer | 206/308.1 |
| 5,938,022 | * 8/1999 | Detloff | 206/308.1 |

FOREIGN PATENT DOCUMENTS

| | | |
|---|---|---|
| 487518 | 6/1938 | (GB) . |
| 2519494 | 9/1996 | (JP) . |
| 3032353 | 10/1996 | (JP) . |
| WO 97/38919 A1 | 10/1997 | (WO) . |
| WO 97/47008 A1 | 12/1997 | (WO) . |

* cited by examiner

Primary Examiner—Paul T. Sewell
Assistant Examiner—Nhan T. Lam
(74) Attorney, Agent, or Firm—Ladas & Parry

(57) ABSTRACT

A CD package includes a CD tray for removably holding a CD, and a paper mount to which the CD tray is affixed. The CD tray is formed of paper produced from raw material other than wood pulp; specifically, paper produced from a combination of kenaf and bamboo fibers. The paper mount is formed of paper that contains kenaf and/or bagasse fibers in an amount of about 5–30% by weight and wood pulp as the, balance.

24 Claims, 6 Drawing Sheets

CD PACKAGE

BACKGROUND OF THE INVENTION

1. Field of the Invention

The present invention relates to a CD package for removably holding a compact disc (CD), or a recording medium which stores digital data, for example, music data on a spiral recording track thereof.

2. Description of the Related Art

CD casings conventionally found in the market are produced from a synthetic resin, such as polystyrene. These CD casings are disposed of as industrial waste. Also, CDs are distributed in CD packages. The CD package includes a CD tray produced from a synthetic resin, a paper mount on which the CD tray is affixed, and a container for accommodating the assembly of the CD tray and the paper mount. When the CD package is to be disposed of, it must be broken up for classified disposal of component parts, or it must be disposed of as industrial waste. Burning component parts produced from a synthetic resin involves emission of poisonous gases. Further, affixing the CD tray on the paper mount involves use of an expensive adhesive, such as a hot-melt adhesive. Also, the casing does not permit printing thereon; thus, printed matter must be contained in the casing in order to provide a user with information about the contained CD.

SUMMARY OF THE INVENTION

An object of the present invention is to solve the above problems involved in a conventional CD casing or CD package and to provide a CD package capable of reducing the cost of disposal of a CD tray, a paper mount on which the CD tray is affixed, and a container that contains the CD tray affixed on the paper mount, permitting burning in a manner similar to that in which wood-pulp-derived paper is burnt, and contributing to forest conservation; for example, through use of paper produced from raw material other than wood pulp, such as paper produced from a combination of kenaf and bamboo fibers, as material for the CD tray.

In order to achieve the above object, the present invention provides a CD package comprising a CD tray for removably holding a CD, the CD tray being formed of paper produced from raw material other than wood pulp; and a container for accommodating the CD tray or a paper mount on which the CD tray is affixed. Since members made of synthetic resin are not used, the cost of classified disposal can be reduced. The CD tray, the paper mount, and the container can be burnt in a manner similar to that in which wood-pulp,-derived paper is burnt.

Preferably, the CD tray is formed of paper containing kenaf fibers in an amount of 70–90% by weight and bamboo fibers in an amount of 10–30% by weight. In this case, consumption of wood is reduced, thereby contributing to forest conservation and thus contributing to environmental protection.

Preferably, the paper mount contains kenaf and/or bagasse fibers in an amount of about 5–30% and wood pulp as the balance. In this case, through use of kenaf and/or bagasse, which are annual grasses, the proportion of wood pulp to total material used is reduced, thereby contributing to forest conservation and thus contributing to environmental protection.

Preferably, the CD tray comprises a bottom wall formed in a rectangular or square shape; a boss projected from a central portion of the bottom wall and adapted to be removably fitted into a center hole of the CD, the boss being chamfered to have four corner portions, and tapered such that the diameter of-the boss reduces toward an end thereof; an annular rest portion provided at a base end of the boss and projected from the bottom wall; projections extending along the corresponding opposite sides of the bottom wall; side rest portions projected toward the boss from the corresponding projections; and wing portions projected from the opposite ends of each of the projections, wherein the boss, the projections, and the wing portions have the same height above the bottom wall; the annular rest portion and the side rest portions have the same height above the bottom wall; and the wing portions each have an inward-projecting end portion that abuts or comes into close proximity to a circumferential edge surface of the CD. In this case, since the annular rest portion and the side rest portions are disposed in such a manner as to have the same height above the bottom wall, the CD can be stably supported on the CD tray while the boss is fitted into the center hole of the CD.

Preferably, four finger-reception recesses are defined by the projection and the wing portions in such a manner as to be opened toward the boss. In this case, the finger-reception recesses receive the user's fingers to thereby enable the user to remove a CD from the CD tray with his/her fingers.

Preferably, aqueous coating is applied to the entire surface of the CD tray or to the surface of the boss and the surfaces of the inward-projecting end portions. In this case, the applied aqueous coating prevents generation of paper dust, which would otherwise result from strong friction between the center hole wall of a CD and the boss of the CD tray or between the circumferential edge surface of the CD and the surfaces of the inward-projecting end portions of the CD tray.

Preferably, a weakly-adhesive seal is affixed to the annular rest portion such that the boss of the CD tray is fitted into a center hole formed therein, thereby enabling removable adhesion of the CD to the weakly-adhesive seal. In this cases, even when some gap is present between the center hole wall of the CD and the boss of the CD tray or between the circumferential edge surface of the CD and the four wing portions, the weakly-adhesive seal prevents the CD from having play or the CD from coming off the CD tray.

Preferably, the CD tray further comprises a peripheral frame portion adapted to be affixed on the paper mount to thereby affix the CD tray on the paper mount. In this case, the CD tray can be reliably affixed on the paper mount at an appropriate position through bonding between the surface of the paper mount and the surface of the peripheral frame portion by means of an inexpensive glue.

Preferably, the container assumes the form of a bag produced from a synthetic resin or the form of a paper box. In this case, the paper mount can be omitted in order to simplify the structure of the CD package and thus providing the CD package at a low price.

Preferably, the paper mount assumes an elongated rectangular shape and is scored, from the front-face side, at four positions perpendicularly to a longitudinal direction across a width to thereby forming two central scores and two outer scores; a space between the central scores is narrower than that between the central score and the outer score; the central scores and the outer scores define four rectangular portions, each having a size similar to or slightly greater than that of the CD tray; the outer rectangular portions are folded inward along the corresponding scores so as to be superposed on the back faces of the inner rectangular portions to thereby yield two pairs of superposed rectangular portions; the paired superposed rectangular portions are bonded together at peripheral portions by means of an adhesive; the CD tray is affixed to either one pair of or both pairs of superposed rectangular portions through bonding between the peripheral frame portion and the corresponding rectangular portion; and one pair of superposed rectangular portions is folded along the central scores to thereby cover the CD tray in cooperation with the other pair of superposed rectangular portions. In this case, the CD can be stably held between the two-folded portions.

Preferably, a round hole is formed in the inner rectangular portion of the two superposed rectangular portions at a central position so as to permit the boss of the CD tray to be loosely fitted therein, and elongated projections are formed on the rectangular portion on either side of the round hole. In this case, the boss of the CD tray is loosely fitted into a round hole formed in the inner rectangular portion while the elongated projections provided on either side of the round hole press a CD fitted to the boss against the annular rest portion and side rest portions of the CD tray, thereby stably holding the CD within the CD tray.

Preferably, the CD tray affixed on the paper mount is accommodated in a container in a drawable manner, the container being formed of paper that contains kenaf and/or bagasse fibers in an amount of 5–30% by weight and wood pulp as the balance. In this case, despite employment of the container, the proportion of wood pulp to total material used is reduced, thereby contributing to forest conservation and thus contributing to environmental protection.

DESCRIPTION OF THE PREFERRED EMBODIMENTS

Embodiments of the present invention will next be described in detail with reference to the drawings.

Figure 1:
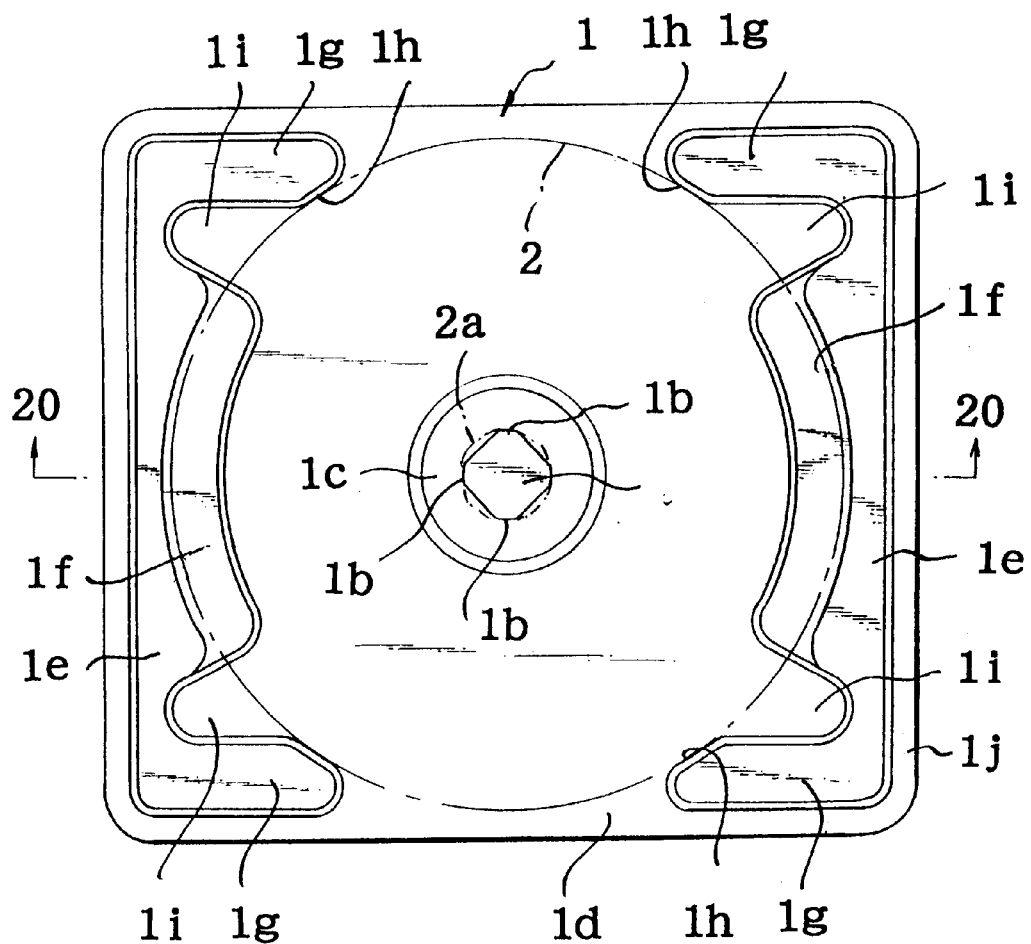
FIG. 1 is a plan view showing a CD tray for use in a CD package according to a first embodiment of the present invention.
Figure 2:
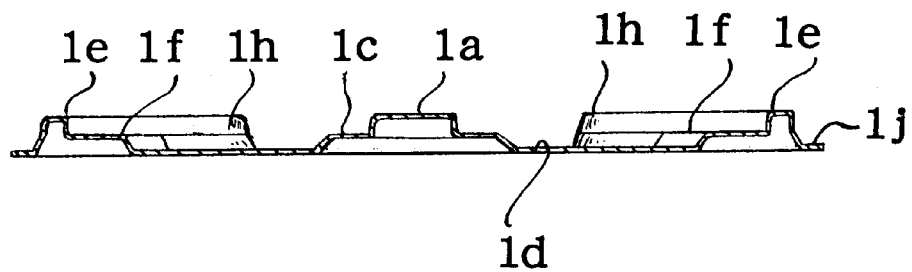
FIG. 2 is a sectional view taken along line 20—20 of FIG. 1.

FIGS. 1 and 2 show a CD package according to a first go embodiment of the present invention. The CD package includes a CD tray 1, which is formed of paper produced from raw material other than wood pulp.

The CD tray 1 is formed of paper produced from raw material other than wood pulp; specifically, paper that contains kenaf fibers in an amount of 70–90% by weight and bamboo fibers in an amount of 10–30% by weight, preferably kenaf fibers in an amount of 80% by weight and bamboo fibers in an amount of 20% by weight.

A boss 1a is projected from a central portion of the CD tray 1 and is adapted to be removably fitted into a center hole 2a formed in a CD 2. The boss la has a square columnar shape, and four corner portions 1b are chamfered such that squire-shaped portions respectively face rightward, leftward upward, and downward in FIG. 1. An annular rest portion 1c is provided at the base end of the boss 1a and is projected from a-bottom wall 1d of the CD tray 1. The boss 1a is tapered such that its diameter reduces from the base end toward the other end. The annular rest portion 1c has a skirt that is tapered such that its diameter reduces from the bottom wall 1d toward the annular rest portion 1c.

Projections 1e are provided in the vicinity of the corresponding opposed sides of the CD tray 1. Side rest portions if are projected from the corresponding projections 1e toward the boss 1a and have a circularly curved end. The boss 1a and the projections 1e have the same height above the bottom wall 1d while the annular rest portion 1c and the side rest portions if have the same height above the bottom wall 1d. Wing portions 1g are projected from the corresponding opposite end portions of each projection 1e. Each wing portion 1g has an inward-projecting end portion 1h, so that the four inward-projecting end portions 1h support the CD 2 at four positions of the circumferential edge surface of the CD 2. The wing portions 1g have the same height as the boss 1a and the projections 1e.

A finger-reception recess 1i is defined by each projection 1e and each wing portion 1g. A user puts his/her fingers into the corresponding finger-reception recesses 1i in order to remove the CD 2 from the CD tray 1. The finger-reception recesses 1i substantially have the shape of the letter "U" and are opened toward the boss 1a. A peripheral frame portion 1j is formed along the side edges of the CD tray 1 and is aligned with the bottom wall 1d.

The CD 2 has a diameter of 120 mm and a thickness of 1.2 mm, and the center hole 2a thereof has a diametrical variation of up to 0.05 mm. The peripheral frame portion 1j has a width of about 2 mm as measured outward from the projections 1e and wing portions 1g. The CD tray 1 has a rectangular or square shape as viewed from above and has rounded corners.

Figure 3:
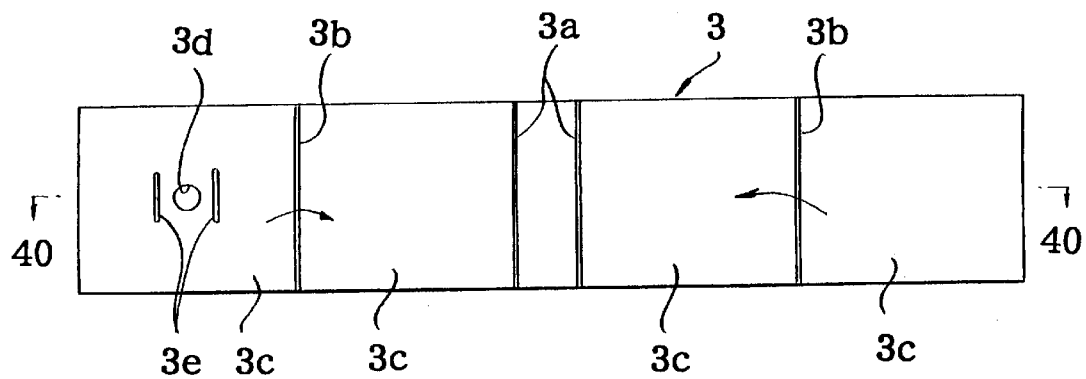
FIG. 3 is an expansion plan view showing a paper mount for use in the CD package of the first embodiment.
Figure 4:
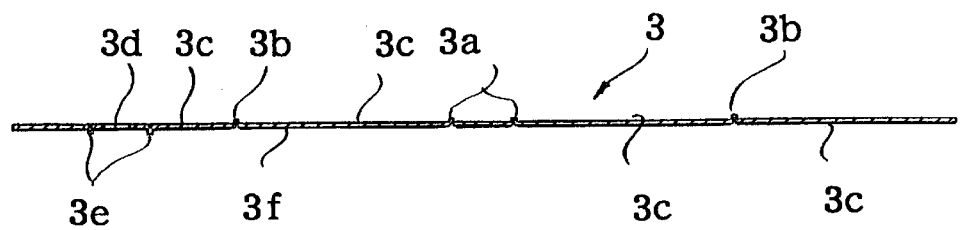
FIG. 4 is a sectional view taken along line 40—40 of FIG. 3.

FIGS. 3 and 4 show a paper mount 3 on which the CD tray 1 is to be bonded. The paper mount 3 is formed of 400 g/m² paper, which contains kenaf and/or bagasse fibers in an amount of about 5–30% by weight and wood pulp as the balance.

As shown in FIG. 3, the paper mount 3 has an elongated rectangular shape and is scored, from the front-face-side, at four positions perpendicularly to the longitudinal direction across the width, thereby forming two central scores 3a and two outer scores 3b. Each outer score 3b is located between the corresponding central score 3a and an end of the paper mount 3. The space between the central scores 3a is rendered slightly greater than the thickness of the CD tray 1. The central scores 3a and the outer scores 3b define four rectangular portions 3c. A round hole 3d slightly larger than the boss 1a of the CD tray 1 is punched in one outer rectangular portion 3c from the back-face side, and elongated projections 3e projecting toward the front-face side are formed on the paper mount 3 in such a manner as to extend in the width direction of the paper mount 3 on either side of the round hole 3d and within a central area of the corresponding rectangular portion 3c.

Figure 5:
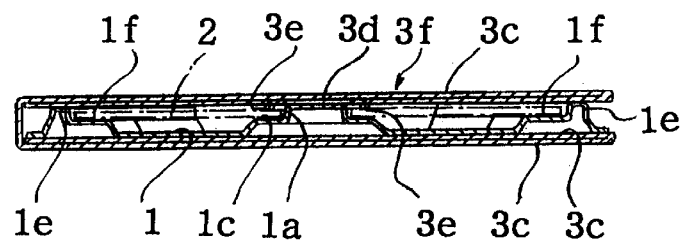
FIG. 5 is an enlarged sectional view showing the paper mount of FIG. 3 In a folded state and the CD tray of FIG. 1 affixed to an inner surface of the paper mount.

The outer rectangular portions 3c are folded inward along the outer scores 3b such that the outer rectangular portions 3c are superposed on the back faces of the inner rectangular portions 3c. The two superposed rectangular portions 3c are affixed together at peripheral portions by means of an adhesive. The pair of superposed rectangular portions 3c having the round hole 3d serves as a cover 3f. The CD tray 1 is affixed on the pair of rectangular portion 3c that does not have the round hole 3d, by means of a conventional glue applied to the back surface of the peripheral frame portion 1j of the CD tray 1. The resultant assembly is shown in FIG. 5.

Figure 6:
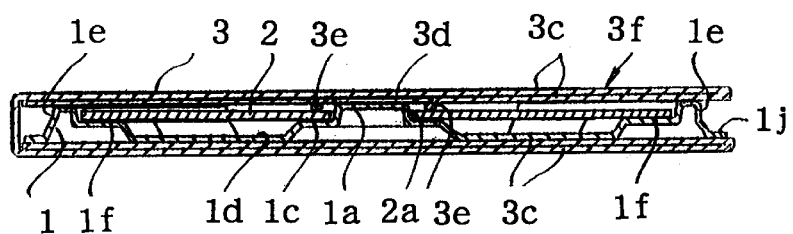
FIG. 6 is an enlarged sectional view showing the paper mount and the CD tray assembled as shown in FIG. 5 while a CD is fitted to the CD tray.
Figure 7:
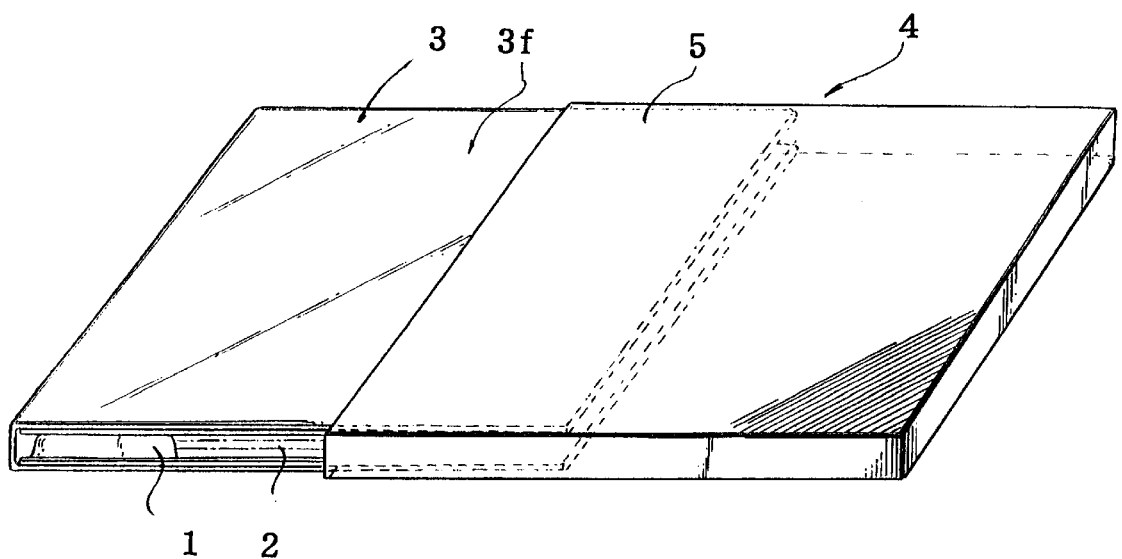
FIG. 7 is a perspective view depicting accommodation of the assembly of FIG. 6 in a container.

The CD 2 that stores, for example, music data is fitted to the CD tray 1 In the following manner: the center hole 2a formed in the CD 2 is fitted to the boss 1a of the CD tray 1; the circumferential edge surface of the CD 2 abuts the four inward-projecting end portions 1h of the CD tray 1; a portion of the CD 2 around the center hole 2a rests on the annular rest portion of the CD tray 1; and circumferential portions of the CD 2 rest on the side rest portions 1f of the CD tray 1. Subsequently, the cover 3f is folded along the scores 3a so as to cover the resting CD 2, so that an end portion of the boss 1a of the CD tray 1 is loosely fitted into the round hole 3d. Thus, the CD 2 is brought into an accommodated state as shown in FIG. 6. The CD tray 1 and the paper mount 3 accommodating the CD 2 are 1 inserted into a container 5 having a shape of a book case as shown in FIG. 7, yielding a CD package 4. The container 5 is formed of paper that contains kenaf and/or bagasse as in the case of the paper mount 3. The paper mount 3 and the container 5 bear printed information as appropriate.

The CD tray 1 is formed of paper produced from raw material other than wood pulp; i.e., paper that contains kenaf fibers in an amount of 70–90% by weight and bamboo fibers in an amount of 10–30% by weight, preferably kenaf fibers in an amount of 80% by weight and bamboo fibers in an amount of 20% bye weight. Accordingly, no part of the CD tray 1 becomes industrial waste. The paper mount 3 and the container 5e are formed of paper that contains kenaf and/or bamboo fibers in an amount of about 30% by weight and wood pulp as the balance, thereby avoiding the cost of classification of component parts, an increase in disposal cost, and emission of poisonous gases during burning, which would result from use of a component part produced from a synthetic resin. Also, being formed of paper, the paper mount 3 and the container 5 can be directly printed with information and permit surface treatment, as needed, and the CD tray 1 can be easily bonded to the paper mount 3 at low cost. Through use of paper produced from raw material other than wood pulp and through use of paper that contains kenaf and/or bagasse fibers as well as wood pulp, contribution is made to forest conservation.

The center hole 2a formed In the CD 2 is fitted to the boss 1a of the CD tray 1; a portion of the CD 2 around the center hole 2a rests on the annular rest portion 1c of the CD tray 1; and peripheral portions of the CD 2 rest on the circularly curved side rest portions 1f. Thus, the CD 2 can be stably held on the CD tray 1.

According to Japanese Utility Model Application No. 5440/1996 (Japanese Utility Model Registration No 3032353), depressions formed at the corresponding four corners of a CD tray are bonded to a mount. By contrast, the CD tray 1 of the present embodiment does not employ the depressions, thereby improving appearance thereof. Since the back surface of the peripheral frame portion 1j of the CD tray 1 is adapted to be bonded to the paper mount 3, the contact surface between the CD tray 1 and the paper mount 3 is of a relatively large area, thereby enabling reliable bonding between the CD tray 1 and the paper mount 3 by means of an inexpensive, conventional glue.

According to conventional practice, the round hole 3d is punched in the paper mount 3 from the front-face side. By contrast, according to the present embodiment, the round hole 3d is punched in the paper mount 3 from the back-face side In such a manner that the elongated projections 3e are projected from the front face of the paper mount 3. Thus, when the cover 3f is closed, the central portion of the CD 2 can be reliably held by means of the boss 1a of the CD tray 1 and the elongated projections 3e of the paper mount 3.

When the CD 2 is to be held simply at 8 positions by means of friction between the CD 2 and the boss 1a and between the CD 2 and the inward-projecting end portions 1h, the friction is designed to be relatively strong; consequently, the contact surfaces are rubbed together strongly. Also, since the center hole 2a formed in the CD 2 has a diametrical variation of about 0.05 mm, in some cases the boss 1a may be fitted into the center hole 2a in a significantly tight manner. As a result, paper dust may be generated. Thus, the present embodiment is not designed to tightly hold the CD 2 by means of friction between the CD 2 and diagonal projections of the boss 1a, but is designed to reliably hold the CD 2 through closing of the cover 3f of the paper mount 3, thereby preventing generation of paper dust. Further, since kenaf and bamboo fibers are long and strong, paper produced therefrom is less likely to generate dust than is paper produced from wood pulp when used as material for the CD tray 1. Also, through application, to a thickness of about 0.2 mm, of aqueous coating, such as aqueous varnish, to the entire surface of the CD tray 1 or to the surfaces of the boss 1a and inward-projecting end portions 1h, generation of paper dust, which would otherwise result from rubbing, can be prevented.

Figure 8:
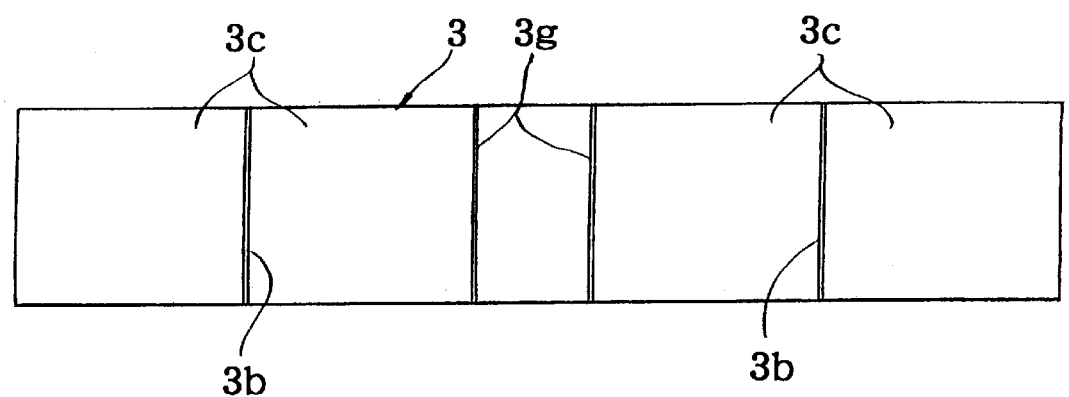
FIG. 8 is an expansion plan view showing a paper mount for use in a CD package according to a modification of the first embodiment.
Figure 9:
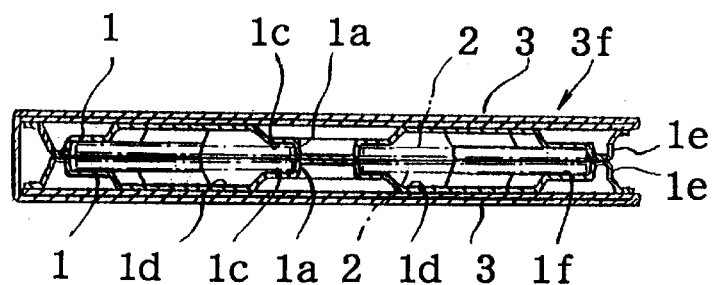
FIG. 9 is an enlarged sectional view showing the paper mount of FIG. 8 in a folded state and the CD trays of FIG. 1 affixed to the corresponding inner surfaces of the paper mount.

FIGS. 8 and 9 show a modification of the first embodiment. The space between two central scores 3g formed on the paper mount 3 is approximately twice that between the central scores 3a of the first embodiment, whereby two CD trays 1 can be affixed on the corresponding opposed inner rectangular portions 3c by means of glue applied to the back surfaces of the peripheral frame portions 1j thereof. Thus, two CDs 2 can be removably held on the corresponding CD trays 1 while facing each other.

Preferably, the above-described modification does not have the round hole 3d and the elongated projections 3e, which are formed in the first embodiment. The modification is configured In a manner similar to that of the first embodiment except the above-described feature. In FIGS. 8 and 9, features similar to those of the first embodiment are denoted by common reference numerals.

Figure 10:
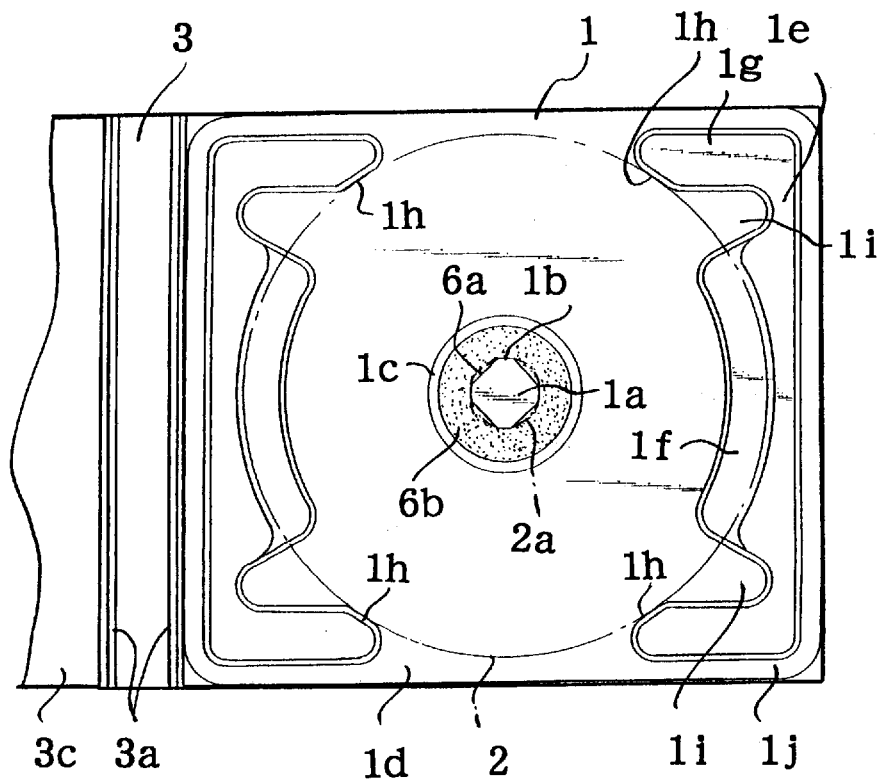
FIG. 10 is a partial plan view showing a CD package according to a second embodiment of the present invention.

FIG. 10 shows a CD package according to a second embodiment of the present invention. As shown in FIG. 10, a weakly-adhesive seal 6 is affixed on the substantially entire surface of the annular rest portion 1c of the CD tray 1 such that the boss 1a of the CD tray 1 is fitted into a center hole 6a formed therein. The seal 6 is coated with an adhesive 6b for adhesively holding the CD 2 in a removable manner. Accordingly, even when a gap is present between the center hole 2a formed in the CD 2 and the boss 1a of the CD tray 1 and between the circumferential edge surface of the CD 2 and the four Inward-projecting end portions 1h of the CD tray 1, the CD 2 will not have play or come off even in the event of vibration. Also, even when the surface of the boss 1a or inward-projecting end portion 1h is damaged as a result of attaching the CD 2 to and detaching from the CD tray 1 by a large number of repetitions, the CD 2 will not have play or come off. Other features, usage, and effects of the second embodiment are similar to those of the first embodiment.

Figure 11:
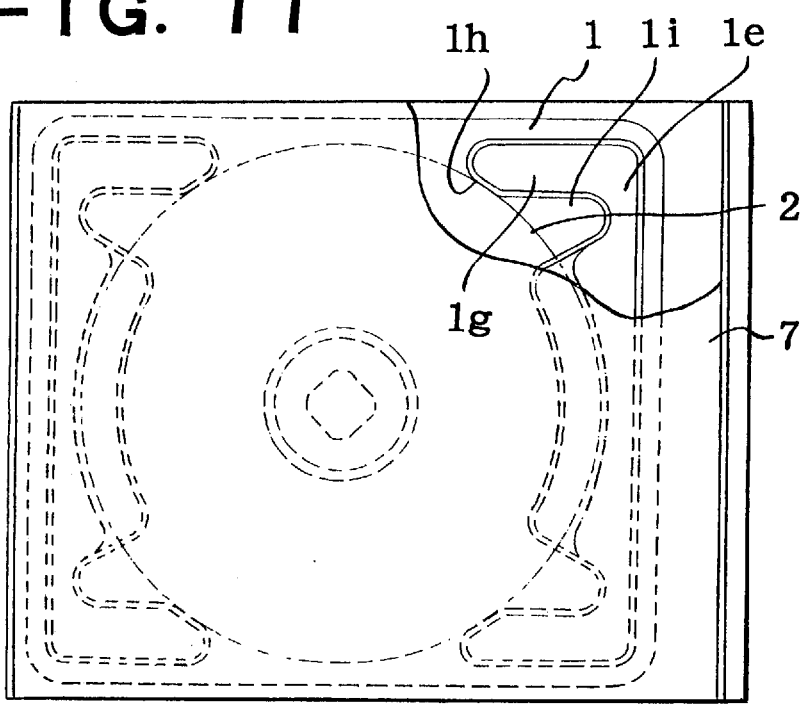
FIG. 11 is a partially cutaway, plan view showing a CD package according to a third embodiment of the present invention.

FIG. 11 shows a CD package according to a third embodiment of the present invention. As shown in FIG. 11, the CD package of the present embodiment includes the CD tray 1 according to the first or second embodiment and a container 7 that assumes the form of a bag produced from a synthetic resin. The CD tray 1 carrying the CD 2 is contained in the bag, which is then shut tightly. When the CD 2 is to be used, the bag is opened and the CD tray 1 carrying the CD 2 is taken out from the bag. The CD 2 is removed from the CD tray 1 and is then used. After being used, the CD 2 is replaced on the CD tray 1.

Figure 12:
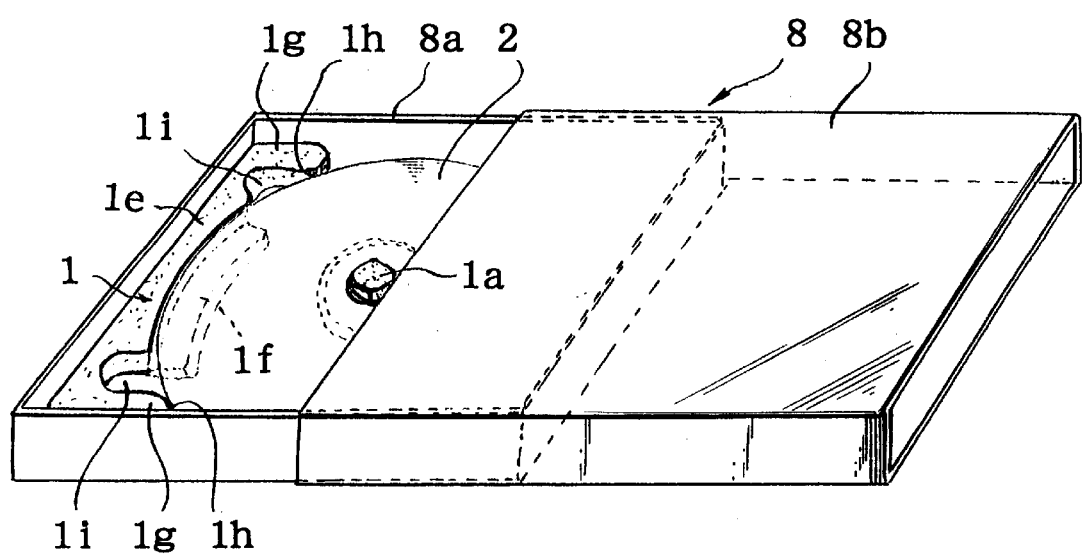
FIG. 12 is a perspective view showing a CD package according to a fourth embodiment of the present invention.

FIG. 12 shows a CD package according to a fourth embodiment of the present invention. As shown in FIG. 12, the CD package of the present embodiment includes the CD tray 1 according to the first or second embodiment and a container 8, which is composed of a box 8 opened upward (in FIG. 12) and a sheath 8b. The CD tray 1 carrying the CD 2 is placed in the box 8a. Then, the sheath 8b is fitted to the box 8a in order to close the container 8. When the CD 2 is to be used, the sheath 8b is removed from the box 8a. The CD 2 is taken out from the box 8a and is then used. After being used, the CD 2 is replaced on the CD tray 1 and the sheath 8b is fitted to the box 8a. The box 8a and the sheath 8b are formed of paper that contains kenaf and/or bagasse fibers in an amount of 5–30% by weight and wood pulp as the balance. The outer surface of the sheath 8b is printed with desired information as needed.

The peripheral frame portion 1; may be omitted from the CD tray 1 to be used in the CD package of the third or fourth embodiment. The fourth embodiment is described while mentioning the box 8a opened upward (in FIG. 12). However, the form of the box 8a is not limited thereto. The box 8a may includes an inner box and an outer box serving as a cover for the inner box. The CD tray 1 may be accommodated in each of the inner and outer boxes. After the CDs 2 are fitted to the corresponding CD trays 1, the inner box is covered with the outer box. The sheath 8b is fitted to the resultant box assembly.

The CD packages of the third and fourth embodiments produce less industrial waste, thereby reducing disposal cost. The CD packages can be burned as are conventional paper and the CD package of the first embodiment.

The above-mentioned containers may assume any form so long as they are formed of paper that contains kenaf and/or bagasse and wood pulp.

What is claimed is:

1. A CD package, comprising:
a CD tray for removably holding a CD, the CD tray being formed of paper produced from raw material other than wood pulp; and
a container for accommodating the CD tray, wherein the CD tray comprises:
a bottom wall formed in a rectangular or square shape;
a boss projected from a central portion of the bottom wall and adapted to be removably fitted into a center hole of the CD, the boss having a diameter, a base end and being chamfered to have four corner portions, and tapered such that the diameter reduces from the base end of the boss toward another end thereof;
an annular rest portion provided at the base end of the boss and projected from the bottom wall;
projections extending along corresponding opposite sides of the bottom wall;
side rest portions projected toward the boss from the projections; and
wing portions projected from opposite ends of each of the projections, wherein
the boss, the projections, and the wing portions have the same height above the bottom wall;
the annular rest portion and the side rest portions have the same height above the bottom wall; and
the wing portions each have an inward-projecting end portion that abuts or comes into dose proximity to a circumferential edge surface of the CD.

2. A CD package according to claim 1, wherein the CD tray is formed of paper containing kenaf fibers in an amount of 10–30% by weight and bamboo fibers in an amount of 10–30% by weight.

3. A CD package according to claim 1, wherein four finger-reception recesses are defined by the projections and the wing portions in such a manner as to be opened toward the boss.

4. A CD package according to claim 1, wherein aqueous coating is applied to an entire surface of the CD tray.

5. A CD package according to claim 1, wherein a weakly-adhesive seal is affixed to the annular rest portion such that the boss of the CD tray is fitted into a center hole formed therein, thereby enabling removable adhesion of the CD to the weakly-adhesive seal.

6. A CD package according to claim 1, wherein the container has the form of a bag produced from a synthetic resin.

7. A CD package according to claim 1, wherein aqueous coating is applied to a surface of the boss and to surfaces of the inward-projecting end portions.

8. A CD package according to claim 1, wherein the container has the form of a paper box.

9. A CD package comprising:
a CD tray for removably holding a CD, the CD tray being formed of paper produced from raw material other than wood pulp; and
a container for accommodating a paper mount on which the CD tray is affixed, wherein the paper mount when unfolded, has an elongated rectangular shape and is scored, from a front-face side, at four positions perpendicularly to a longitudinal direction across a width to thereby forming two central scores and two outer scores; a space between the central scores is narrower than that between the central score and the outer score; the central scores and the outer scores define four rectangular portions consisting of outer rectangular portions and inner rectangular portions each having a size similar to that of the CD tray; the outer rectangular portions are folded inward along the corresponding scores so as to be superposed on back faces of the inner rectangular portions to thereby yield two pairs of superposed rectangular portions; the paired superposed rectangular portions are bonded together at peripheral portions by means of an adhesive; the CD tray is affixed to at least one of the two pairs of superposed rectangular portions through bonding between the peripheral frame portion and the corresponding rectangular portion; and one pair of superposed rectangular portions is folded along the central scores to thereby cover the CD tray in cooperation with the other pair of superposed rectangular portions.

10. A CD package according to claim 9, wherein a round hole is formed in one of the outer rectangular portions at a central position so as to permit the boss of the CD tray to be loosely fitted therein, and elongated projections are formed on said one of the rectangular portions on either side of the round hole.

11. A CD package according to claim 9, wherein the CD tray affixed on the paper mount is accommodated in a container in a drawable manner, the container being formed of paper that consists of fibers in an amount of 5–30% by weight and wood pulp the fibers being selected from a group consisting of kenaf, bagasse and combinations thereof.

12. A CD package comprising:
a CD tray for removably holding a CD, the CD tray being formed of paper produced from raw material other than wood pulp; and
a container for accommodating a paper mount on which the CD tray is affixed, wherein the paper mount, when unfolded, has an elongated rectangular shape and is scored, from a front-face side, at four positions perpendicularly to a longitudinal direction across a width to thereby forming two central scores and two outer scores; a space between the central scores is narrower than that between the central score and the outer score; the central scores and the outer scores define four rectangular portions consisting of outer rectangular portions and inner rectangular portions, each having a size slightly greater than that of the CD tray; the outer rectangular portions are folded inward along the corresponding scores so as to be superposed on back faces of the inner rectangular portions to thereby yield two pairs of superposed rectangular portions; the paired superposed rectangular portions are bonded together at peripheral portions by means of an adhesive; the CD tray is affixed to at least one of the two pairs of superposed rectangular portions through bonding between the peripheral frame portion and the corresponding rectangular portion; and one pair of superposed rectangular portions is folded along the central scores to thereby cover the CD tray in cooperation with the other pair of superposed rectangular portions.

13. A CD package according to claim 12, wherein a round hole is formed in one of the outer rectangular portions at a central position so as to permit the boss of the CD tray to be loosely fitted therein, and elongated projections are formed on said one of the rectangular portions on either side of the round hole.

14. A CD package according to claim 12, wherein the CD tray affixed on the paper mount is accommodated in a container in a drawable manner, the container being formed of paper that consists of fibers in an amount of 5–30% by weight and wood pulp, the fibers being selected from a group consisting of kenaf, bagasse and combinations thereof.

15. A CD package, comprising:
a CD tray for removably holding a CD, the CD tray being formed of paper produced from raw material other than wood pulp; and
a container for accommodating a paper mount on which the CD tray is affixed, wherein the CD tray comprises:
a bottom wall formed in a rectangular or square shape;
a boss projected from a central portion of the bottom wall and adapted to be removably fitted into a center hole of the CD, the boss having a diameter, a base end and being chamfered to have four corner portions, and tapered such that the diameter reduces from the base end of the boss toward another end thereof;
an annular rest portion provided at the base end of the boss and projected from the bottom wall;
projections extending along the corresponding opposite sides of the bottom wall;
side rest portions projected toward the boss from the corresponding projections; and
wing portions projected from the opposite ends of each of the projections, wherein
the boss, the projections, and the wing portions have the same height above the bottom wall;
the annular rest portion and the side rest portions have the same height above the bottom wall; and
the wing portions each have an inward-projecting end portion that abuts or comes into close proximity to a circumferential edge surface of the CD.

16. A CD package according to claim 15, wherein the paper mount consists of fibers in an amount of 5–30% by weight and wood pulp, the fibers being selected from a group consisting of kenaf, bagasse and combinations thereof.

17. A CD package according to claim 15, wherein the CD tray further comprises a peripheral frame portion adapted to be affixed on the paper mount to thereby affix the CD tray on the paper mount.

18. A CD package according to claim 15, wherein the CD tray is formed of paper containing kenaf fibers in an amount of 10–30% by weight and bamboo fibers in an amount of 10–30% by weight.

19. A CD package according to claim 15, wherein four finger-reception recesses are defined by the projections and the wing portions in such a manner as to be opened toward the boss.

20. A CD package according to claim 15, wherein aqueous coating is applied to an entire surface of the CD tray.

21. A CD package according to claim 15, wherein aqueous coating is applied to a surface of the boss and to surfaces of the inward-projecting end portions.

22. A CD package according to claim 15, wherein a weakly-adhesive seal is affixed to the annular rest portion such that the boss of the CD tray is fitted into a center hole formed therein, thereby enabling removable adhesion of the CD to the weakly-adhesive seal.

23. A CD package according to claim 15, wherein the container has the form of a bag produced from a synthetic resin.

24. A CD package according to claim 15, wherein the container has the form of a paper box.

* * * * *